(12) United States Patent
Hara

(10) Patent No.: US 9,514,394 B2
(45) Date of Patent: Dec. 6, 2016

(54) IMAGE FORMING APPARATUS CAPABLE OF CHANGING IMAGE DATA INTO DOCUMENT DATA, AN IMAGE FORMING SYSTEM, AND AN IMAGE FORMING METHOD

(71) Applicant: KYOCERA Document Solutions Inc., Osaka (JP)

(72) Inventor: Hiroyuki Hara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/665,015

(22) Filed: Mar. 23, 2015

(65) Prior Publication Data

US 2015/0278658 A1    Oct. 1, 2015

(30) Foreign Application Priority Data

Mar. 31, 2014 (JP) ................. 2014-072101
Mar. 31, 2014 (JP) ................. 2014-072104

(51) Int. Cl.
*G06K 15/02* (2006.01)
*G06K 9/34* (2006.01)
*G06K 9/68* (2006.01)

(52) U.S. Cl.
CPC ........... *G06K 15/1827* (2013.01); *G06K 9/342* (2013.01); *G06K 9/6828* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 6,282,327 | B1 * | 8/2001 | Betrisey | G06F 17/214 345/469 |
| 2002/0076111 | A1 * | 6/2002 | Dance | G06K 9/6828 382/229 |
| 2005/0067498 | A1 * | 3/2005 | Smith | G06K 15/1849 235/494 |
| 2007/0177206 | A1 * | 8/2007 | Miyazawa | G06F 3/1208 358/1.15 |
| 2009/0110313 | A1 | 4/2009 | Sakaue | |
| 2015/0138220 | A1 * | 5/2015 | Chapman | G06T 11/60 345/589 |

FOREIGN PATENT DOCUMENTS

JP    2009-284171 A    12/2009

* cited by examiner

*Primary Examiner* — Christopher D Wait
(74) *Attorney, Agent, or Firm* — McDonnell Boehnen Hulbert & Berghoff LLP

(57) ABSTRACT

An image forming apparatus that changes image data into document data includes a character recognition unit, a font matching unit, and a character attribute data setting unit. The character recognition unit recognizes a character from the image data. The font matching unit performs matching so as to determine which of a plurality of fonts and a plurality of character sizes a recognized character corresponds to, with respect to an area of the image data, recognized as the character by the character recognition unit. The character attribute data setting unit sets, in the document data, a font and a character size whose matching is established by the font matching unit and sets an origin of drawing, a character width, and a side bearing as a drawing position of a character so that the origin of drawing, the character width, and the side bearing correspond to the image data.

3 Claims, 10 Drawing Sheets

```
X dict begin
/FontType 3 def                              501
/FontMatrix [.001 0 0 .001 0 0] def
/FontBBox [0 0 1000 -1000] def /Encoding 256 array def                      502
        0 1 255 {Encoding exch /.notdef put} for
        Encoding 80 /P put
/CharProcs 3 dict def
        CharProcs begin
                /.notdef {} def
                /P
                {                            503
                  2.526 -0.275 moveto
                  0 -11.987 17.981 -27.971 39.958 -33.965 rcurveto
                  37.960 -9.990 39.958 -27.971 39.958 -299.687 rcurveto
                  0 -271.717 -1.998 -289.698 -39.958 -299.687 rcurveto
                  -85.910 -21.977 -33.965 -45.952 99.896 -45.952 rcurveto
                  133.860 0 185.805 23.975 99.896 45.952 rcurveto
                  -33.965 7.992 -39.958 27.971 -39.958 131.862 rcurveto
                  0 121.873 rlineto
                  79.917 0 rlineto
                  119.875 0 193.798 45.952 219.771 135.858 rcurveto
                  27.971 91.904 3.996 167.825 -71.925 217.773 rcurveto
                  -67.929 43.954 -427.554 65.931 -427.554 25.973 rcurveto
                  closepath
                  344.532 -80.747 moveto
                  83.912 -83.912 29.969 -239.750 -83.912 -239.750 rcurveto
                  -55.942 0 rlineto
                  0 139.854 rlineto
                  0 135.858 1.998 139.854 49.948 139.854 rcurveto
                  27.971 0 67.929 -17.981 89.906 -39.958 rcurveto
                  closepath
                  fill
                } bind def
        end
        /BuildGlyph
                {1000 0
                 0 0 100 -1000
                 setcachedevice
                 exch /CharProcs get exch              504
                 2 copy known not
                 {pop /.notdef}
                 if
                 get exec
                } bind def
        /BuildChar
                {1 index /Encoding get exch get
                        1 index /BuildGlyph get exec
                 } bind def
        currentdict
end
/ExampleFontX exch definefont pop /ExampleFontX findfont 12 scalefont setfont    505
369.6 400 moveto
(P) show
showpage

IMAGE FORMING APPARATUS CAPABLE OF CHANGING IMAGE DATA INTO DOCUMENT DATA, AN IMAGE FORMING SYSTEM, AND AN IMAGE FORMING METHOD

INCORPORATION BY REFERENCE

This application is based on, and claims priority to corresponding Japanese Patent Application Nos. 2014-072101 and 2014-072104, all filed in the Japan Patent Office on Mar. 31, 2014, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus, an image forming system, and an image forming method.

BACKGROUND

A typical image forming apparatus, such as a multifunction peripheral (MFP) capable of printing a document and image, includes a function for converting image data acquired by a scanner or the like into document data such as Portable Document Format (PDF).

There has been known, for example, an image processing apparatus that extracts, from image data, pieces of attribute data including character attributes, and determines which of the character attributes among the extracted pieces of attribute data corresponds to preliminarily stored character fonts. Then, the image processing apparatus performs vectorization using an outline corresponding to the determined font, and vectorizes attributes other than the character attributes by outlining as a line drawing. Finally, the image processing apparatus transmits vectorization attribute data, subjected to vectorization, to another apparatus.

However, in the above-described image processing apparatus, a character is only vectorized. Therefore, it was difficult to acquire font information such as the type of font or the character size of that character.

In other words, the font information is not identified at the time of being generated by a word processor software or the like, the font information serving as the source of image data. Therefore, it is difficult to convert the image data into the same document data as an original manuscript.

SUMMARY

The present disclosure relates to an image forming apparatus capable of changing image data into document data, an image forming system, and an image forming method.

According to the present disclosure, the image forming apparatus changes image data into document data. The image forming apparatus includes a character recognition unit, a font matching unit, and a character attribute data setting unit.

The character recognition unit recognizes a character from the image data.

The font matching unit performs matching so as to determine which of a plurality of fonts and a plurality of character sizes a recognized character corresponds to, with respect to an area of the image data, recognized as the character by the character recognition unit.

The character attribute data setting unit sets, in the document data, a font and a character size whose matching is established by the font matching unit and sets an origin of drawing, a character width, and a side bearing as a drawing position of a character so that the origin of drawing, the character width, and the side bearing correspond to the image data.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

FIG. 10 is a schematic conceptual diagram of drawing data according to the character drawing position correction process illustrated in FIG. 6.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming commands as at least one unit of carrying out one or more of the functions described herein.

Figure 1:
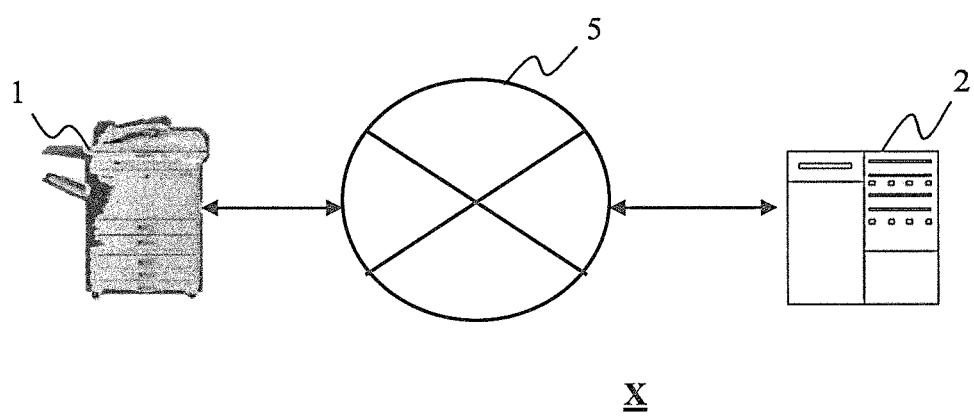
FIG. 1 is a schematic diagram illustrating a functional block configuration of an image forming system according to an embodiment of the present disclosure.

FIG. 1 is a schematic diagram illustrating the functional block configuration of an image forming system X according to an example embodiment of the present disclosure. The image forming system X includes an image forming apparatus 1 and a server 2.

The image forming apparatus 1 may be an MFP including a scanner or the like and transmits image data 200 (FIG. 5) to the server 2.

The server 2 may be an information processing apparatus such as, for example, a PC server (e.g., a PC/AT compatible machine or an ARM (registered trademark) server) placed on a data center or the like. In addition, the server 2 may be a terminal such as, for example, a personal computer (PC), a smartphone, a mobile phone, a personal digital assistant (PDA) of a user and may adopt a configuration of functioning as an information processing apparatus by executing an installed server program. The server 2 performs an image file generation process (to be described later) on the image data acquired from the image forming apparatus 1.

The image forming apparatus 1 and the server 2 are connected to a network 5 serving as a local area network (LAN), a wireless LAN, a wide area network (WAN), a mobile phone network, or the like.

Figure 2:
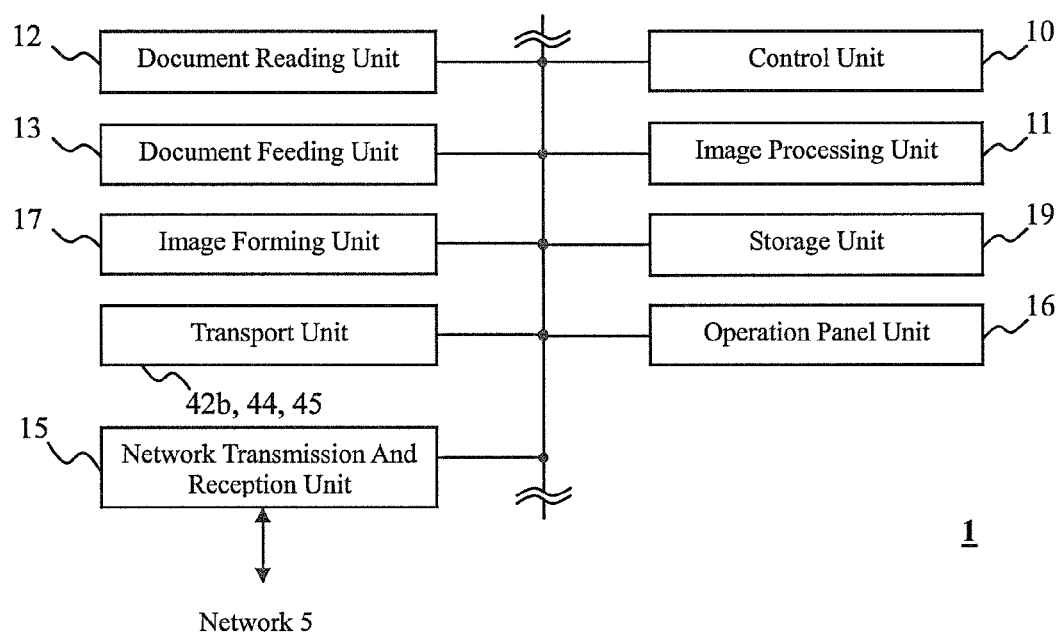
FIG. 2 is a schematic diagram illustrating a functional block configuration of an image forming apparatus in the image forming system.

FIG. 2 is a schematic diagram illustrating an example functional block configuration of the image forming apparatus 1 in the image forming system X. In the image forming apparatus 1, an image processing unit 11, a document reading unit 12, a document feeding unit 13, a transport unit (including paper feeding rollers 42b, a transport roller pair 44, and an ejection roller pair 45), a network transmission and reception unit 15, an operation panel unit 16, an image forming unit 17, a storage unit 19, and so forth are connected to a control unit 10. The operations of the individual units are controlled by the control unit 10.

The control unit 10 may be, for example, a general purpose processor (GPP), a central processing unit (CPU), a micro processing unit (MPU), a digital signal processor (DSP), a graphics processing unit (GPU), an application specific processor (ASP), or the like.

The control unit 10 reads a control program stored in a non-transitory computer-readable media (e.g., a ROM or an HDD) in the storage unit 19 and deploys, in a RAM, and executes the control program, thereby being caused to operate as the individual units of functional blocks to be described later. In addition, in accordance with specified instruction information input from an external terminal (not illustrated) or the operation panel unit 16, the control unit 10 controls the entire apparatus.

The image processing unit 11 may be a control and arithmetic unit such as, for example, a DSP or a GPU. The image processing unit 11 performs image processing on data of various kinds of images and performs various kinds of image processing such as, for example, scaling, density adjustment, gradation adjustment, and image improvement.

The image processing unit 11 stores, in the storage unit 19, an image read by the document reading unit 12, as print data. At this time, the image processing unit 11 may convert the print data into the file unit of a format such as, for example, PDF or TIFF.

The document reading unit 12 reads a set document.

The document feeding unit 13 transports the document to be read by the document reading unit 12.

Based on an output instruction from a user, the image forming unit 17 performs image formation from data on a sheet of recording paper, the data being stored in the storage unit 19, read by the document reading unit 12, or acquired from the external terminal.

The transport unit transports the recording paper from one of paper feeding cassettes 42a (FIG. 3), causes image formation to be performed thereon in the image forming unit 17, and after that, transports the recording paper to a stack tray 50.

In addition, the operations of the document reading unit 12, the document feeding unit 13, the transport unit, and the image forming unit 17 will be described later.

The network transmission and reception unit 15 includes a LAN board, a wireless receiver-transmitter, and so forth used for connecting to an external network such as an LAN, a wireless LAN, a WAN, and a mobile phone network.

The network transmission and reception unit 15 transmits and receives pieces of data using a line for data communication and transmits and receives audio signals using a voice telephone line.

Via a network, the network transmission and reception unit 15 may be connected to external terminals (not illustrated), such as a PC, a smartphone, a PDA, and a mobile phone, a server, and so forth.

The operation panel unit 16 includes a display unit such as, for example, an LCD, a numerical keypad, buttons for starting, cancellation, and switching between operation modes of copying, facsimile transmission, a scanner, and so forth. The operation panel unit 16 can further include an input unit such as, for example, a button or a touch panel used for generating an instruction according to execution of a job relating to printing, transmission, storing, recording, or the like of a selected document.

The operation panel unit 16 acquires an instruction of a user for the image forming apparatus 1. Based on this instruction of the user, an image file generation process to be described later is started. In addition, based on instructions of users, pieces of information of the respective users can be input or modified.

In addition, the operation panel unit 16 may include a connection unit that connects with a recording medium for storing the image data 200 (FIG. 5) such as, for example, a USB memory, a flash memory card, or an external device.

The storage unit 19 may be a semiconductor memory (i.e., non-transitory computer-readable media) such as, for example, a read only memory (ROM) or a random access memory (RAM) or a recording medium such as a hard disk drive (HDD).

Even in a power saving state, the storage content of the RAM in the storage unit 19 can be held by a function such as self-refresh.

In the ROM or the HDD in the storage unit 19, a control program for controlling the operation of the image forming apparatus 1 may be stored. In addition to this, the storage unit 19 can store account settings for the users. In addition, the storage unit 19 includes an area for a storage folder for each user.

In addition, in the image forming apparatus 1, the control unit 10 and the image processing unit 11 may be integrally formed in such a manner as a GPU-equipped CPU or a chip-on-module package.

In addition, the control unit 10 and the image processing unit 11 may each incorporate a RAM, a ROM, a flash memory, other non-transitory computer-readable media, or the like.

In addition, the image forming apparatus 1 may include a facsimile transmission and reception unit that performs facsimile transmission and reception.

Figure 3:
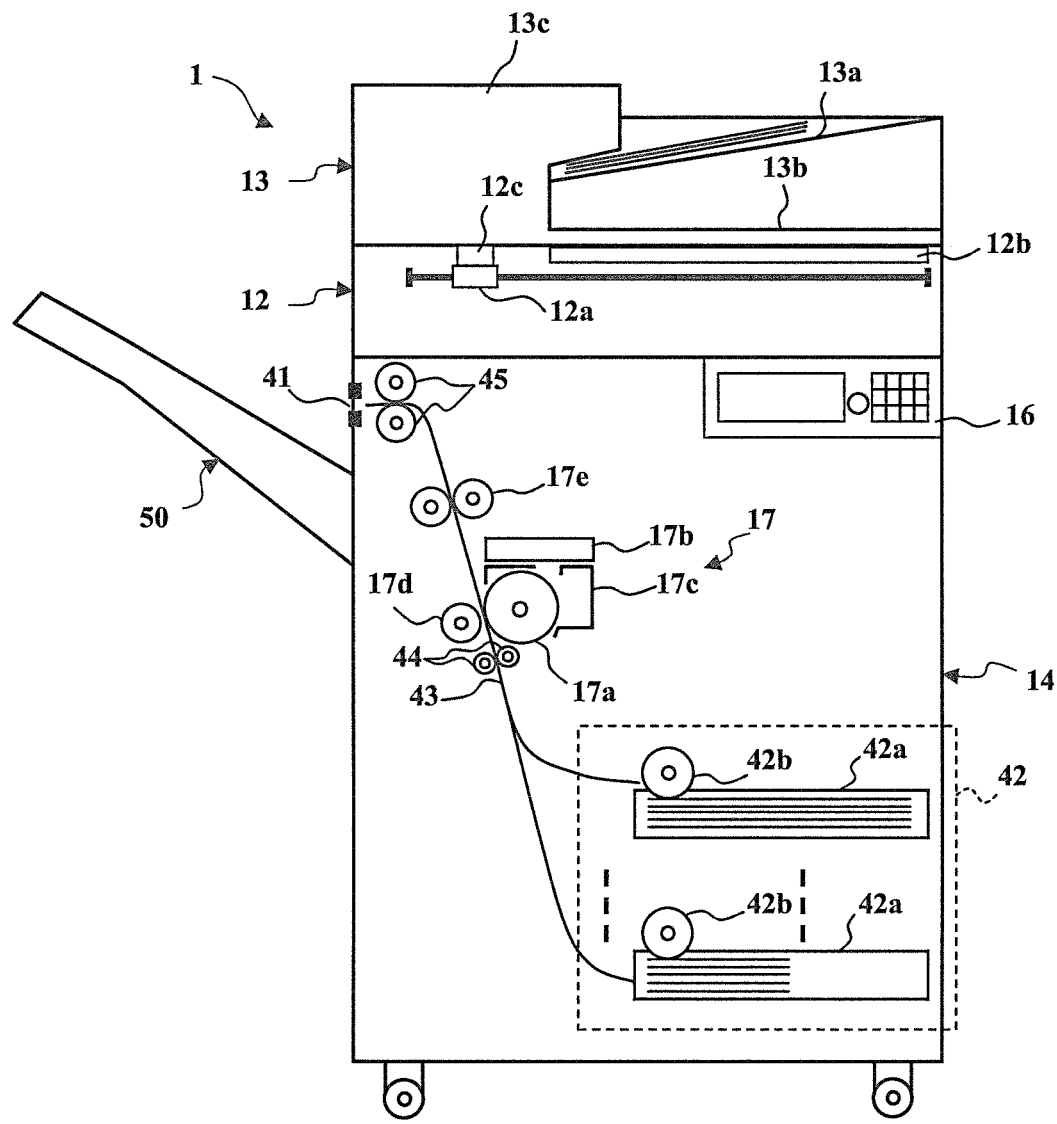
FIG. 3 is a schematic diagram illustrating an internal configuration of the image forming apparatus.

FIG. 3 is a schematic diagram illustrating an example internal configuration of the image forming apparatus 1.

The document reading unit 12 may be positioned in the upper portion of a main body portion 14, and the document feeding unit 13 may be positioned above the document reading unit 12. The stack tray 50 may be set up on an ejection port 41's side, the ejection port 41 being used for recording paper and formed in the main body portion 14, and the operation panel unit 16 may be set up on the front side of the image forming apparatus 1.

The document reading unit 12 includes a scanner 12a, a platen glass 12b, and a document reading slit 12c. The scanner 12a can include an exposure lamp and a charge coupled device (CCD), a complementary metal oxide semiconductor (CMOS) image sensor, or the like. The scanner 12a can also be configured to be movable in the transport direction of documents based on the document feeding unit 13.

The platen glass 12b may be a platen configured by a transparent member such as, for example, glass. The document reading slit 12c includes a slit formed in a direction perpendicular to the transport direction of documents based on the document feeding unit 13.

To read a document placed on the platen glass 12b, the scanner 12a may be moved to a position facing the platen glass 12b, acquire the image data 200 by reading the document while scanning the document placed on the platen glass 12b, and output the acquired image data 200 to the control unit 10 (FIG. 2) provided in the main body portion 14.

In addition, to read a document transported by the document feeding unit 13, the scanner 12a may be moved to a position facing the document reading slit 12c, acquire the image data 200 by reading the document through the document reading slit 12c in synchronization with the transport operation of the document based on the document feeding unit 13, and output the acquired image data 200 to the control unit 10 provided in the main body portion 14.

As shown in the example of FIG. 3, the document feeding unit 13 can include a document placing unit 13a, a document ejection unit 13b, and a document transport mechanism 13c. Documents placed on the document placing unit 13a are sequentially transported one by one, by the document transport mechanism 13c, to a position facing the document reading slit 12c and then ejected to the document ejection unit 13b.

In addition, the document feeding unit 13 may be configured so as to be foldable and by lifting upward the document feeding unit 13, it is possible to cause the upper surface of the platen glass 12b to be open.

The main body portion 14 includes the image forming unit 17 and includes a paper feeding unit 42, a paper transport path 43, a transport roller pair 44, and an ejection roller pair 45. The paper feeding unit 42 includes the paper feeding cassettes 42a, which each house sheets of recording paper whose size or direction may be different, and paper feeding rollers 42b that each feed sheets of recording paper one by one from the corresponding paper feeding cassette 42a to the paper transport path 43. The paper feeding rollers 42b, the transport roller pair 44, and the ejection roller pair 45 function as a transport unit. Sheets of recording paper are transported by this transport unit.

The sheets of recording paper fed to the paper transport path 43 by the paper feeding rollers 42b are transported to the image forming unit 17 by the transport roller pair 44. In addition, the sheets of recording paper subjected to recording by the image forming unit 17 are ejected to the stack tray 50 by the ejection roller pair 45.

The image forming unit 17 includes a photoconductor drum 17a, an exposure unit 17b, a developing unit 17c, a transfer unit 17d, and a fixing unit 17e. The exposure unit 17b may be an optical unit equipped with a laser device, a mirror, lenses, an LED array, and so forth. The exposure unit 17b can perform exposure by outputting, based on image data, light or the like to the photoconductor drum 17a primarily charged by a charging unit (not illustrated), and form an electrostatic latent image on the surface of the photoreceptor drum 17a. The developing unit 17c may be a development unit that develops, using toner, the electrostatic latent image formed in the photoconductor drum 17a. That is, the developing unit 17c forms, on the photoconductor drum 17a, a toner image based on the electrostatic latent image. The transfer unit 17d transfers, to a sheet of recording paper, the toner image formed on the photoconductor drum 17a by the developing unit 17c. The fixing unit 17e applies heat to the sheet of recording paper, to which the toner image may be transferred by the transfer unit 17d, and fixes the toner image to the sheet of recording paper.

Figure 4:
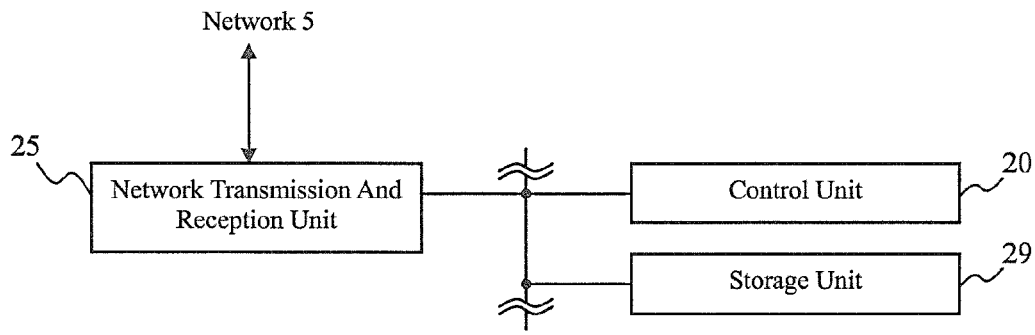
FIG. 4 is a schematic diagram illustrating a functional block configuration of a server in the image forming system.

FIG. 4 is a schematic diagram illustrating the functional block configuration of the server 2 in the image forming system X.

The server 2 includes a control unit 20, a network transmission and reception unit 25, and a storage unit 29. The operations of the respective units are controlled by the control unit 20.

The control unit 20 may be equipped with arithmetic and control capacities as, for example, a GPP, a CPU, an MPU, a DSP, a GPU, an ASP, or the like. Using hardware resources, the control unit 20 executes a program stored in the storage unit 29.

The network transmission and reception unit 25 may be used for connecting to the network 5 and is, for example, a LAN interface based on a standard such as 1000BASE-T/100BASE-TX, a wireless LAN interface, a cellular radio wave transmission/reception device, or the like. The server 2 may transmit and receive various kinds of data via the network transmission and reception unit 25.

In addition, the network transmission and reception unit 25 may be connected to an external hub, a router, or the like and connected to the network 5.

The storage unit 29 includes a RAM, a flash memory disk such as a solid state drive (SSD), a hard disk drive (HDD), a magnetic tape device, an optical disk device, other non-transitory computer-readable media, and so forth. The storage unit 29 stores therein an operating system (OS), various kinds of programs of the server, and data, used for causing the server 2 to function. The details of these programs and data will be described later.

Figure 5:
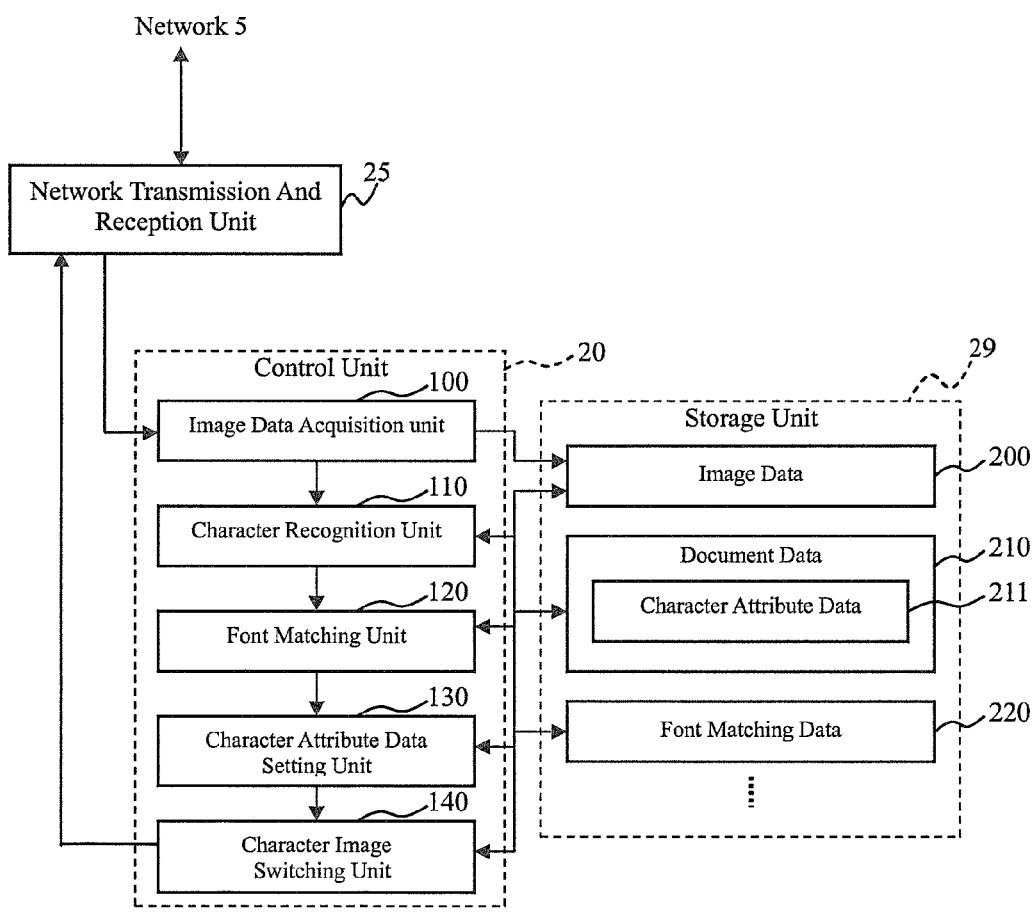
FIG. 5 is a schematic diagram illustrating functional block configurations of a control unit and a storage unit in the server.

FIG. 5 is a schematic diagram illustrating the functional block configurations of the control unit 20 and the storage unit 29 in the server 2.

The control unit 20 in the server 2 includes an image data acquisition unit 100, a character recognition unit 110, a font matching unit 120, a character attribute data setting unit 130, and a character image switching unit 140.

The storage unit 29 stores the image data 200, document data 210, and font matching data 220.

The network transmission and reception unit 25 receives the image data 200 and transmits the converted document data 210.

The image data acquisition unit 100 acquires the image data 200 used for performing optical character recognition (OCR) and so forth.

The image data acquisition unit 100 acquires the image data 200 transmitted from the image forming apparatus 1 and received by the network transmission and reception unit 25 via the network 5, and stores the image data 200 in the storage unit 29.

At this time, based on an instruction of a user, such as "network scan", the image data acquisition unit 100 may cause a document including printed characters to be scanned by the document reading unit 12 and transmitted to the server 2 as the image data 200.

In addition, based on an instruction of a user operating the operation panel unit 16 in the image forming apparatus 1, the image data acquisition unit 100 may cause the image data 200, scanned by the document reading unit 12, or the image data 200, located within a document box, to be transmitted to the server 2.

In addition, the image data acquisition unit 100 may acquire the image data 200 from a connected recording medium, an external terminal, a server, or the like.

The character recognition unit 110 performs optical character recognition or the like on the image data 200 acquired by the image data acquisition unit 100 and recognizes characters.

For example, the character recognition unit 110 recognizes, from the image data 200, an area 301 in which one or more characters are drawn, calculates a vector or the like of the line drawing of each character, and judges a character code with respect to each vector, for example, using an artificial neural network or the like. After this, the character recognition unit 110 sets, in the document data 210, a character code judged as character attribute data 211.

In addition, at the time of, for example, the optical character recognition, the character recognition unit 110 may store, in the storage unit 29, the coordinates of the recognized area 301 recognized as characters within the image data 200 and the data of the vectors or the like of the line drawing of characters.

With respect to the area 301 of the image data 200, recognized as characters by the character recognition unit 110, the font matching unit 120 performs matching so as to determine which of a plurality of fonts and a plurality of character sizes included in the font matching data 220 a recognized character corresponds to.

The font matching unit 120 calculates, for example, the size of a "bounding box" serving as the drawing area of the drawing data of a font of the font matching data 220 corresponding to a character code output by the character recognition unit 110, and estimates a character size. When a plurality of fonts or character sizes are estimated, the font matching unit 120 performs matching by performing image comparison on either one or both of (i) one of the fonts and (ii) one of the character sizes, and calculating the degree of similarity. The font matching unit 120 selects a font and a character size where the degree of similarity is the highest. When the selected font and character size have the degree of similarity greater than or equal to a specified threshold value, the font matching unit 120 determines as corresponding to the font and the character size and establishing matching. In addition, when the degree of similarity is lower than the specified threshold value, the font matching unit 120 determines that there are no corresponding font and no corresponding character size and matching is not established.

The character attribute data setting unit 130 sets, in the document data 210, the font and character size based on the matching established by the font matching unit 120. The character attribute data setting unit 130 also sets the drawing position of a character so that the drawing position of a character corresponds to the image data 200.

The character attribute data setting unit 130 sets, for example, each character of the character attribute data 211 of the document data 210 to a font and a character size determined to correspond, by the font matching unit 120. In addition, the character attribute data setting unit 130 performs a setting so that the character is located at a drawing position corresponding to the image data 200 at the time of being viewed or printed. Therefore, as the drawing position of the character, the character attribute data setting unit 130 sets the origin 401 of drawing (FIG. 8), a character width 404, and a left side bearing 403 so that the origin 401, the character width 404, and the left side bearing 403 correspond to the image data 200. In addition, the character attribute data setting unit 130 may set the document data 210 in which right, left, upper, and lower side bearings, and so forth are set, so that the right, left, upper, and lower side bearings, and so forth correspond to the image data 200.

In addition, the character attribute data setting unit 130 calculates a subsequent origin 402 where a character is subsequently drawn in accordance with the origin 401 calculated in accordance with a character whose matching is established by the font matching unit 120. Further, when the subsequent origin 402 and the origin 401 of the subsequent character coincide with each other, the character attribute data setting unit 130 sets as a character within an identical text 321 (FIG. 11), in the document data 210.

From this, when the document data 210 is viewed or output by the image forming unit 17, the character is drawn at approximately the same position as that of the image data. In addition, it is possible to put together characters for each of the same texts as those of a document serving as the source of the image data 200, and the conveniences of users are enhanced.

When, with respect to the drawing position of the document data 210 corresponding to the area 301 of the image data 200, the font matching unit 120 determines as corresponding to none of the fonts and the character sizes included in the font matching data 220 and no matching is established, the character image switching unit 140 sets, in the document data 210, line drawing including no character or the drawing data of an image.

In addition, when the font matching unit 120 determines as corresponding to one of the fonts and the character sizes included in the font matching data 220 and matching is established, the character image switching unit 140 may leave the drawing data of a recognized character set, as the character attribute data 211, in the document data 210.

The image data 200 includes the image of a character whose resolution is compatible with optical character recognition. The image data 200 may be, for example, data read by the document reading unit 12 and subjected to the image process by the image processing unit 11.

In addition, the image data 200 may be a file of a bitmapped image of RGB color, CMYK color, monochrome, or grayscale, a file slightly compressed by a method such as, for example, run length or LZW, or the like.

In addition, the image data 200 may be a file already converted into a format of PDF, Joint Photographic Experts Group (JPG), Portable Network Graphics (PNG), a bitmap image (BMP), Tagged Image File Format (TIFF), or the like by the control unit 20 in the server 2 or the control unit 10 or the image processing unit 11 in the image forming apparatus 1.

In addition, the image data 200 may be a file of an image of JPG, PDF, or the like including an image acquired from a document box in the storage unit 29, a connected recording medium, an external terminal, another server, or the like.

In addition, when the image data 200 is PDF, the character attribute data 211 already subjected to character recognition may be included.

In addition, the image data 200 may be data of an image of JBIG or the like, subjected to facsimile reception.

The document data 210 is data for a document including characters.

The document data 210 may be, for example, a file whose format is similar to an electronic document or print data based on PDF, PostScript (registered trademark) (PS), Page Description Language (PDL), or the like. In addition, the document data 210 may be a hypertext file such as a hyper text markup language (HTML). In addition, the document data 210 may be files of various kinds of application software (hereinafter, referred to as an "application") such as a word processor, spreadsheet software, and drawing software. In this case, the document data 210 may be a file or the like of, for example, ".docx (Microsoft Word)", ".xlsx (Microsoft Excel)", or scalable vector graphics (SVG). In addition, the document data 210 may be a page file for printing, or the like.

In addition, in a case of PDF, the document data 210 may include the character attribute data 211 and the image data 200. Alternatively, the document data 210 can include the character attribute data 211 and omit the image data 200.

In addition, in the present embodiment, an example when the document data 210 is PDF or PS will be described.

The character attribute data 211 is data of character codes and attributes of characters included in the document data 210.

When the image data 200 is subjected to character recognition by the character recognition unit 110, generating document data, the character attribute data 211 may include character codes and data of the rough drawing positions of characters.

In addition, in the character attribute data 211, data such as the fonts and the character sizes of individual characters and the drawing positions of characters may be set by the character attribute data setting unit 130. In the character attribute data 211, as the data of the drawing positions of characters, the origin 401 of drawing (FIG. 8), the subsequent origin 402, the left side bearing 403, the character width 404, and so forth may be set. At this time, side bearings other than the left side bearing 403 may be set. In addition, in the character attribute data 211, as the bounding box, a font box, or the like, data of a text such as the text 321 (FIG. 11) serving as the gathering of characters may be set.

In addition, when the document data 210 is PS, PDF, PDL, or the like, the character attribute data 211 may include data of an object of font dictionary data.

The font matching data 220 is data for performing, with a character code as a search key, matching on the image data 200 when the character code is drawn.

For example, the font matching data 220 may include, as a character table or the like, bitmap data of each character of a plurality of fonts generated with, for example, 0.1-point increments. As individual fonts of the font matching data 220, standard fonts of a typical PC and an in-house device of the image forming apparatus 1, a standard font for a printed material, and so forth may be included. In addition, as the character sizes of the font matching data 220, in accordance with the dots per inch (dpi) or the like of the image data 200, for example, data of sizes of 8 points to 96 points may be included. In addition, in the font matching data 220, with respect to individual character sizes of each font, data when character decorations such as a bold typeface, an italic typeface, an underline, and hatching are performed may be included. In addition, with respect to individual fonts and individual character sizes, the font matching data 220 may include the coordinates of bounding boxes in which characters are drawn, for each character in character tables.

In addition, the font matching data 220 may be vector (line drawing) data of fonts rather than bitmap data. In this case, as for the area of the image data 200, bit maps whose character sizes are changed may be individually drawn and subjected to comparison.

Here, by executing a control program stored in the storage unit 29, the control unit 20 in the server 2 is caused to function as the image data acquisition unit 100, the character recognition unit 110, the font matching unit 120, the character attribute data setting unit 130, and the character image switching unit 140.

In addition, the above-mentioned individual units in the server 2 become hardware resources for executing a program of the present disclosure.

Based on FIG. 6 to FIG. 11, an image file generation process performed by the image forming apparatus 1 according to an embodiment of the present disclosure will be described.

In the image file generation process of the present embodiment, first the image data 200 is acquired and optical character recognition is performed, thereby generating the document data 210. In addition, using a character code output by this optical character recognition, matching is performed so as to determine which font and which character size the area 301 recognized as a character of the image data 200 is output with. As for the point of a character where it is possible to establish matching, the drawing position of a character of the document data 210 is corrected, and the same character information as that of a document serving as the source of the image data 200 is written. At this time, the origin, the character width, and the side bearing of drawing are set. As for the point of a character where it is difficult to establish matching, the character of the document data 210 is deleted and replaced with the drawing data of a vector.

As for the image file generation process of the present embodiment, the control unit 20 mainly executes a program stored in the storage unit 29 in cooperation with the individual units, using hardware resources.

Figure 6:
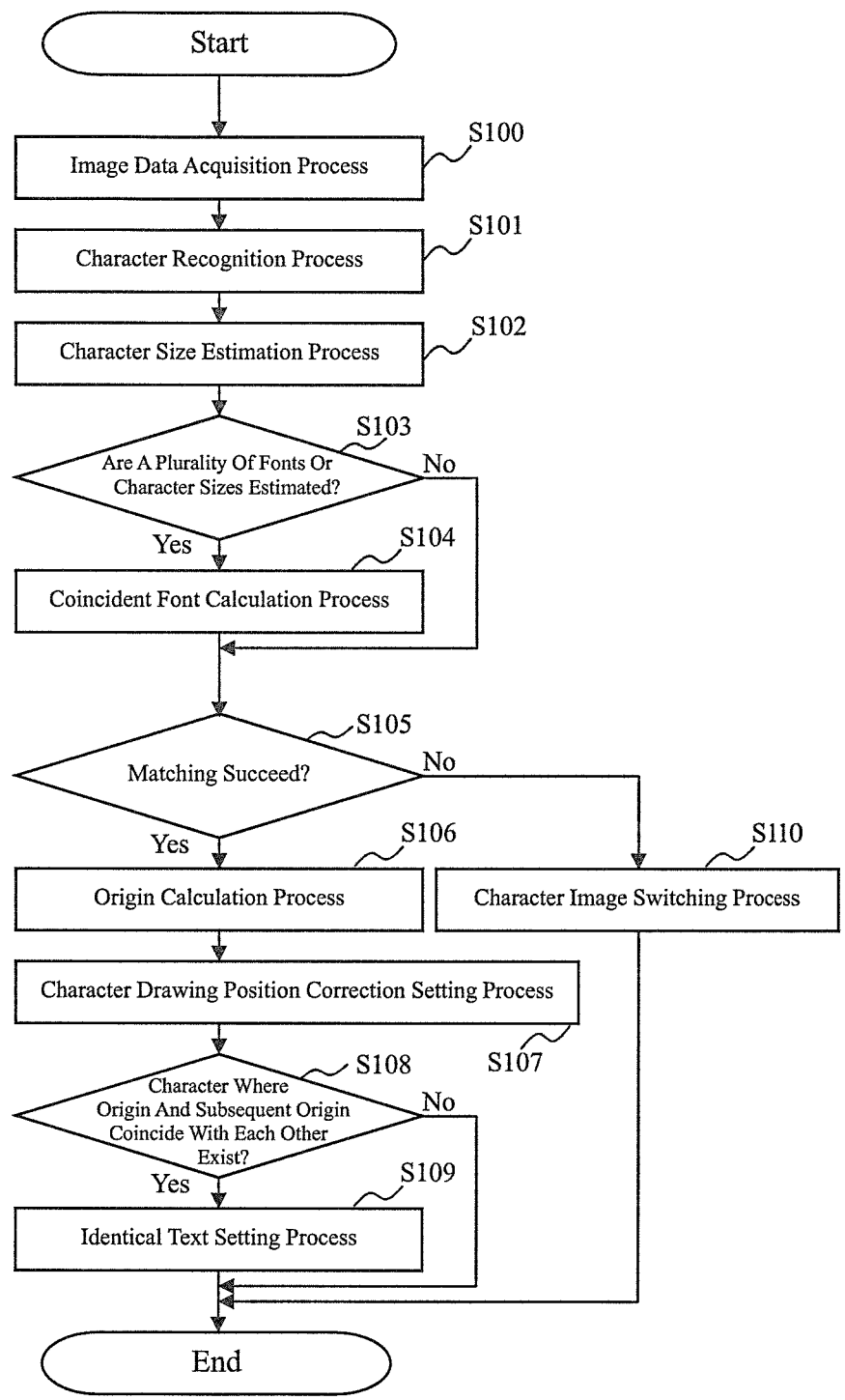
FIG. 6 is a flowchart of image file generation process according to an embodiment of the present disclosure.
Figure 7A:
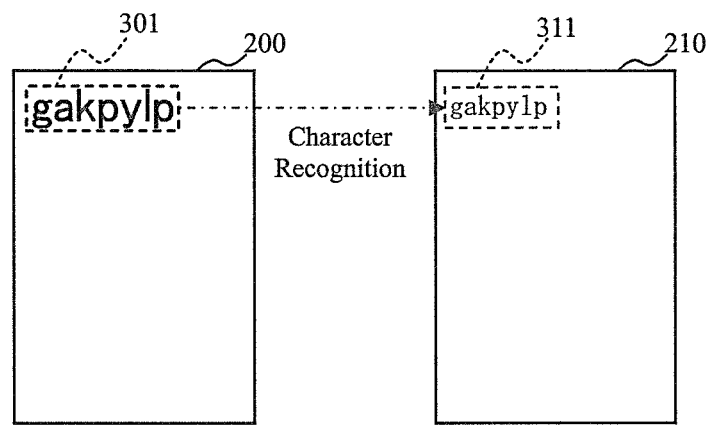
FIGS. 7A and 7B are schematic conceptual diagrams of a character recognition process illustrated in FIG. 6.
Figure 7B:
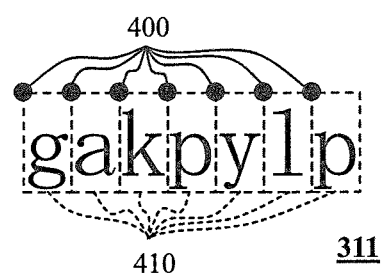
Figure 8A:
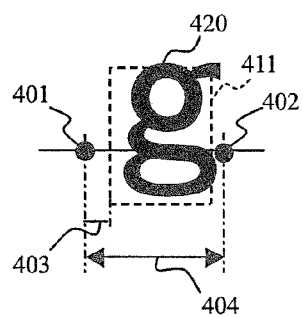
FIGS. 8A to 8C are schematic conceptual diagrams of a character size estimation process and a coincident font calculation process illustrated in FIG. 6.
Figure 8B:
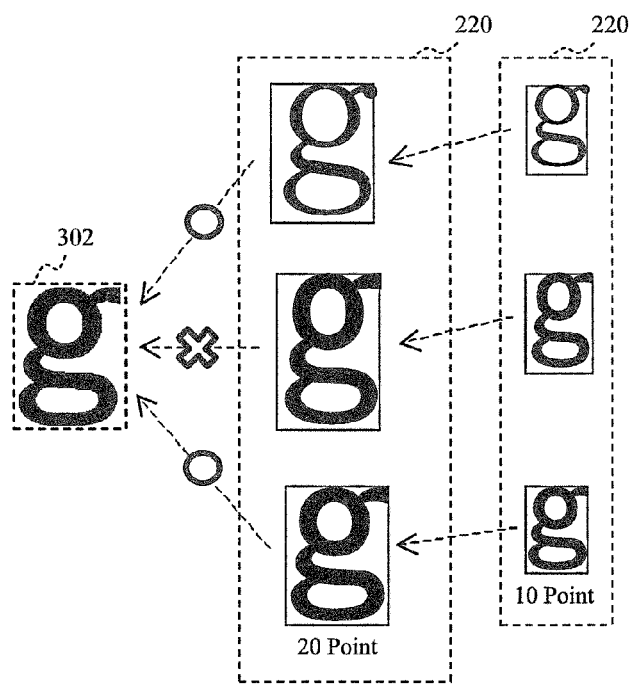
Figure 8C:
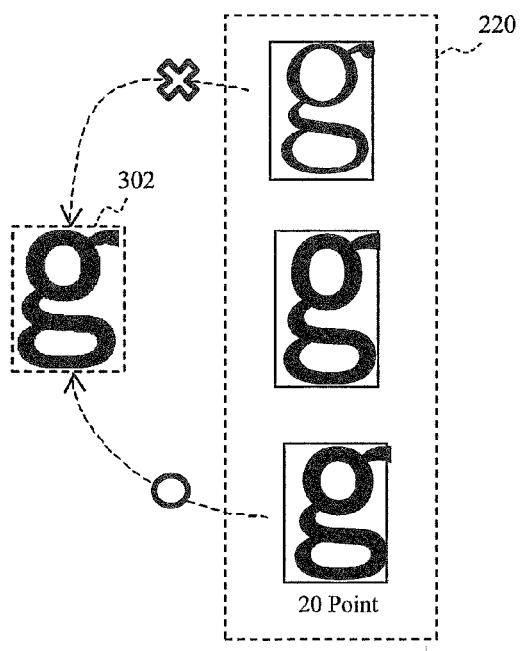
Figure 9:
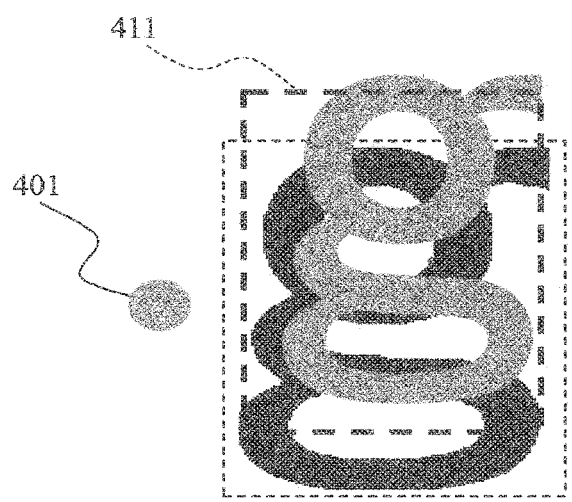
FIG. 9 is a schematic conceptual diagram of an origin calculation process and a character drawing position correction process illustrated in FIG. 6.
Figure 11:
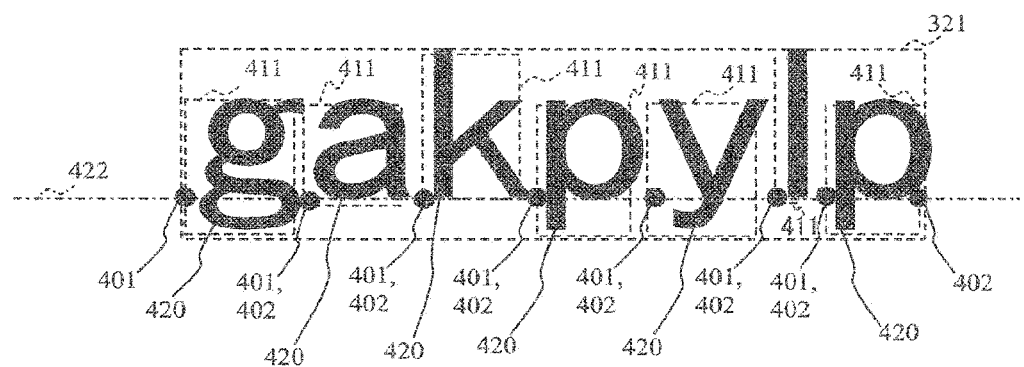
FIG. 11 is a schematic conceptual diagram of an identical text setting process illustrated in FIG. 6.

FIG. 6 is the flowchart of the image file generation process according to an embodiment of the present disclosure. FIGS. 7A and 7B are the schematic conceptual diagrams of a character recognition process (S101) illustrated in FIG. 6. FIGS. 8A to 8C are the schematic conceptual diagrams of a character size estimation process (S102) and a coincident font calculation process (S104) illustrated in FIG. 6. FIG. 9 is the schematic conceptual diagram of an origin calculation process (S106) and a character drawing position correction process (S107) illustrated in FIG. 6. FIG. 10 is the schematic conceptual diagram of drawing data according to the character drawing position correction process (S107) illustrated in FIG. 6. FIG. 11 is the schematic conceptual diagram of an identical text setting process (S109) illustrated in FIG. 6.

(Step S100)

First, as the image data acquisition unit 100, the control unit 20 performs the image data acquisition process.

In addition, the control unit 20 acquires the image data 200 from the image forming apparatus 1 or the like via the network transmission and reception unit 25 and stores the image data 200 in the storage unit 29.

In addition, the control unit 20 generates a file for the document data 210 corresponding to the image data 200. At this time point, while no character is set in the document data 210, an image included in the image data 200 may be copied thereto.

In addition, the control unit 20 may transmit a command for remote scanning to the image forming apparatus 1 via the network 5 and cause a document, in which characters are printed, to be scanned by the document reading unit 12. In this case, the control unit 10 in the image forming apparatus 1 transmits the scanned image data 200 to the server 2. At this time, in a case of a spread document such as a book, the control unit 10 may perform a process to deform an end portion. In addition, the control unit 10 may perform processing operations for removing the dust of an image, removing moire, increasing the sharpness of an image, and DPI conversion. In addition, to improve processing speed, the control unit 10 may perform these image processing operations using a GPU or the like in the image processing unit 11.

In addition, the control unit 20 may acquire the image data 200 from a recording medium, an external terminal, a server, or the like (not illustrated), and store the image data 200 in the storage unit 29.

In addition, the control unit 20 may acquire the image data 200 received by a facsimile transmission and reception unit (not illustrated) in the image forming apparatus 1 and store the image data 200 in the storage unit 29.

In addition, the control unit 20 may convert the acquired image data 200 into data in a specific format.

(Step S101)

Next, as the character recognition unit 110, the control unit 20 performs the character recognition process.

According to FIG. 7A, the control unit 20 searches for points at which characters are drawn within the image data 200 and performs character recognition for each character with respect to the searched points. The control unit 20 sets, in the document data 210, data such as a character drawing area 311 of recognized characters while causing the data such as the character drawing area 311 to be included in the character attribute data 211.

According to FIG. 7B, the drawing position of the character drawing area 311 is set so as to be located at a position of being viewed or printed at roughly the same position as that of the image data 200 within the document data 210. When the document data 210 is, for example, PS, PDF, PDL, or the like, the character drawing area 311 may be defined as a collection of font boxes 410 including the origin of the character drawing area 311 and character codes in an encoding format such as UTF8.

In the character drawing area 311 at this time point, only the origin 400 of each font box 410 and a default (previously defined) font may be set. Therefore, if the drawing data of the character drawing area 311 at this time point is drawn, drawing different from a document serving as the source of the image data 200 occurs as a result.

In addition, the control unit 20 may store, in the storage unit 29 as temporary data, recognized character codes and the coordinates of the area 301 of the image data 200 recognized as characters. In addition, the control unit 20 may store the vector data or the like of characters, calculated at the time of the character recognition, in the storage unit 29 as temporary data.

In addition, the control unit 20 may recognize a graphic or the like other than characters. In addition, when the character attribute data 211 already subjected to character recognition is included in the image data 200, the character recognition process may be skipped.

(Step S102)

Next, as the font matching unit 120, the control unit 20 performs the character size estimation process.

According to FIG. 8A, in the coincident font calculation processing in the step S104 in the present process, the control unit 20 calculates the types of font and character sizes with respect to individual characters subjected to OCR. In addition, the control unit 20 sets pieces of drawing data such as the bounding box 411 serving as the drawing area of each character, the origin 401 of the drawing of a font, the subsequent origin 402 serving as the origin of a subsequent character, the left side bearing 403 serving as a blank space on a left side in character drawing, and the character width 404. At this time, the control unit 20 calculates the origin 401, the character width 404, and the left side bearing 403 so that the coordinates thereof coincide with the image data 200. Therefore, first, in the present process, the control unit 20 estimates a character size.

According to FIG. 8B, within the font matching data 220, the control unit 20 compares the size of the character area 302 of each character in the area 301 of the image data 200 recognized as characters, calculated in the above-described character recognition process, and the size or the like of the bounding box of each font in each character size with each other, and estimates a character size. At the time of this comparison, the control unit 20 compares the size of the area 302 in consideration of the sizes of coordinates in which a character is actually drawn in accordance with the bounding box 411. In addition, at this time, the control unit 20 compares the bounding box of data at a time when a character decoration is performed. In addition, the control unit 20 may reference pieces of information such as, for example, the size of the image data 200, dpi, and/or resolution at the time of comparison.

The control unit 20 estimates, as the type of font and the character size, those where the size of the bounding box is coincident based on the comparison. At this time, a plurality of fonts and a plurality of character sizes may be estimated. The control unit 20 temporarily stores, in the storage unit 29, the estimated type of font and an estimated character size.

In addition, at the time of performing search, the control unit 20 may reference and compare a character size with respect to FontBBox information or the like of the character drawing area 311 calculated by the above-described character recognition process.

(Step S103)

Next, as the font matching unit 120, the control unit 20 determines whether or not a plurality of fonts or a plurality of character sizes are estimated. When the types of font or the character sizes are estimated in the above-described character size estimation process, the control unit 20 determines as Yes. In the other cases, in other words, in a case in which that only one type of font and only one character size are coincident is estimated or no coincident type of font or no coincident character size exists, the control unit 20 determines as No.

In a case of Yes, the control unit 20 moves the process to the step S104.

In a case of No, the control unit 20 moves the process to a step S105.

(Step S104)

When a plurality of the types of font and character sizes are estimated, the control unit 20 performs the coincident font calculation process, as the font matching unit 120.

According to FIG. 8C, the control unit 20 compares each of the bitmapped images of the types of font or character sizes and the image of an actual character within the area 302 with each other, thereby performing matching for searching for the most coincident bitmapped image. As this comparison, the control unit 20 may set, for example, windows of 8 to 192 dots in vertical and horizontal directions and calculate the degree of similarity of the luminance of the dark point of each pixel using dynamic programming or the like. At this time, the control unit 20 may calculate the degree of similarity where a printing condition such as the tendency of a character outline to be thick in a printed document is taken into consideration, or may change to two black-and-white values and calculate the degree of similarity at a fast rate, using bit addition or the like. The control unit 20 may select, as the nearest image, for example, an image where such a degree of similarity becomes the highest. In addition, the control unit 20 may calculate the coordinates of a window at this time.

The control unit 20 temporarily stores, in the storage unit 29, the font, the coordinates on the window, the degree of similarity, and so forth of the selected nearest image.

In this way, only when the types of font and character sizes are calculated, comparison is performed so as to determine whether a character is coincident, thereby enabling to rapidly search for a font and a character size.

(Step S105)

Here, as the font matching unit 120, the control unit 20 determines whether or not matching succeeds. In a case in which, for example, only one coincident type of font and only one coincident character size are estimated in the above-described character size estimation process or when the degree of similarity is greater than or equal to the specified threshold value in the above-described coincident font calculation process, the control unit 20 determines that a recognized character corresponds to one of fonts and one of character sizes within the font matching data 220, in other words, matching succeeds, and determines as Yes. In the other cases, for example, in a case in which no coincident type of font or no coincident character size is calculated in the character size estimation processing or when the degree of similarity is less than the specified threshold value in the coincident font calculation process, the control unit 20 determines that a corresponding font and a corresponding character size do not exist, in other words, matching fails, and determines as No.

In a case of Yes, the control unit 20 moves the process to the step S106.

In a case of No, the control unit 20 moves the process to a step S110.

(Step S106)

When matching succeeds, as the character attribute data setting unit 130, the control unit 20 performs the origin calculation process.

According to FIG. 9, using an estimated font and an estimated character size, the control unit 20 compares the image of an actual character within the area 302 and calculates the most coincident coordinates, thereby calculating the origin 401, based on the coordinates. As for this comparison, windows of, for example, 8 to 192 dots in vertical and horizontal directions may be set and the degree of similarity of the luminance of the dark point of each pixel may be calculated using dynamic programming or the like, thereby calculating the most coincident coordinates. At this time, in the same way as the above-mentioned coincident font calculation processing, the control unit 20 may calculate the degree of similarity where a printing condition is taken into consideration, or may change to two black-and-white values and calculate the degree of similarity at a fast rate, using bit addition. In addition, at this time, the control unit 20 may calculate the subsequent origin 402 (FIG. 8), based on the origin 401.

In addition, the control unit 20 may calculate this drawing position from, for example, coordinates on a window of the above-described matching process and the coordinates of the area 301 of the image data 200 recognized as characters. In addition, when this character is drawn, the control unit 20 may confirm whether or not the character actually overlaps with the image of the area 301 of the image data 200, thereby calculating the degree of similarity.

(Step S107)

Next, as the character attribute data setting unit 130, the control unit 20 performs the character drawing position correction setting process.

The control unit 20 specifies the origin 401 calculated in the above-described origin calculation process, specifies a font and a character size in the character size estimation processing or the coincident font calculation process, and sets the character attribute data 211 in the document data 210.

At this time, the control unit 20 changes, for example, a font, a character size, and the drawing position of the font of the document data 210. When the document data 210 is PS, PDF, PDL, or the like, the control unit 20 registers, as the character attribute data 211, the font dictionary of a font and a character size where the degree of similarity is greater than or equal to the threshold value, and sets a drawing position, as the information of a "start-of-writing position". Here, the control unit 20 sets the drawing position of a character within the character attribute data 211 in the document data 210 so that the drawing position of a character corresponds to a calculated accurate drawing position on the image data 200. The control unit 20 sets, in the character attribute data 211 in the document data 210, pieces of drawing data such as, for example, the bounding box 411, the origin 401 of the drawing of a font, the subsequent origin 402 serving as the origin of a subsequent character, the left side bearing 403, and the character width 404, illustrated in FIG. 8A.

FIG. 10 illustrates an example where the pieces of drawing data are registered within the font dictionary of the character attribute data 211 in the document data 210 serving as PS.

Drawing data 501 is an example in which, for example, "type3" is specified as a font and a glyph coordinate system and a font boundary are specified.

Drawing data 502 is an example of the definition of an array for converting a character code into a character name. In this example, a code "80" is converted into "P".

Drawing data 503 is an example of a dictionary for storing therein a glyph description (vectorization character).

Drawing data 504 is an example of a code indicating the specification of a glyph creation procedure. This code indicates a character boundary, the acquisition of a dictionary, and so forth.

Drawing data 505 is an example of a code indicating font dictionary acquisition, font size specification, position specification, character display, and so forth, used for character drawing.

(Step S108)

Next, as the character attribute data setting unit 130, the control unit 20 determines whether or not a character exists where the origin 401 and the subsequent origin 402 coincide with each other. When a plurality of characters exist within the character attribute data 211 set in the document data 210, the control unit 20 judges whether or not a distance between the origin 401 and the corresponding subsequent origin 402 is less than or equal to a specified threshold value, with respect to two adjacent characters. When the distance between such a pair of characters is less than or equal to the specified threshold value, the control unit 20 determines as Yes. In other words, when the subsequent origin 402 calculated in accordance with the origin 401 calculated in accordance with a character whose matching is established and the origin 401 of a subsequent character coincide with each other, the control unit 2 determines as Yes. In the example of FIG. 11, the subsequent origin 402 of a corresponding previous character and the character origin 401 of a corresponding subsequent character coincide with each other with respect to each of characters of "gakpylp". Therefore, the control unit 20 determines as Yes. In the other cases, the control unit 20 determines as No.

In a case of Yes, the control unit 20 moves the process to the step S109.

In a case of No, the control unit 20 terminates the image file creation process.

(Step S109)

In a case in which adjacent characters where the origin 401 and the subsequent origin 402 coincide with each other exist within the character attribute data 211, the control unit 20 performs the identical text setting process as the character attribute data setting unit 130.

According to FIG. 11, when the subsequent origin 402 of a previous character and the origin 401 of a subsequent character coincide with each other, there is a high possibility of being characters within an identical text of a document serving as the source of the image data 200. Therefore, in the example of FIG. 11, the control unit 20 sets, in the character attribute data 211, the two relevant characters as characters within the identical text 321.

After that, the control unit 20 terminates the image file creation process.

(Step S110)

When an area recognized as a character of the image data 200 does not succeed in matching of a font and a character size, the control unit 20 performs the character image switching process as the character image switching unit 140.

With respect to the area 301 of the image data 200, recognized as characters, the control unit 20 deletes the information of characters within the document data 210 and replaces with data of vectors (line drawing). As vector data for the replacement, for example, data of vectors of line drawing of characters calculated in the above-described character recognition process may be used. In addition, the control unit 20 may output the image of the area 301 to the document data 210 without change.

From the above, the image file generation process according to an embodiment of the present disclosure is terminated.

In an apparatus of the related art that performs character recognition, at the time of converting image data into document data, it is difficult to accurately set the font of a character and a character size. Therefore, it is difficult to convert the image data into the same document data as an original document.

On the other hand, the server 2 according to an embodiment of the present disclosure is configured so as to be able to change the image data 200 into the document data 210 and includes the image data acquisition unit 100 that acquires the image data 200, the character recognition unit 110 that recognizes a character from the image data 200 acquired by the image data acquisition unit 100, the font matching unit 120 that performs matching on the area 301 of the image data 200 (recognized as characters by the character recognition unit 110 so as to determine which of a plurality of fonts and a plurality of character sizes a recognized character corresponds to), and the character attribute data setting unit 130 that sets, in the document data 210, a font and a character size whose matching is established by the font matching unit 120 and sets, as the drawing position of a character, the origin 401 of drawing, the character width 404, and the left side bearing 403 so that the origin 401 of drawing, the character width 404, and the left side bearing 403 correspond to the image data 200.

By adopting such a configuration, it becomes possible to restore the format of a character printed in a document serving as the source of the image data 200. From this, it becomes possible to convert the document data 210, obtained from the image data 200 by performing character recognition, into the same files as the files of various kinds of applications. In other words, it becomes possible to convert into the same document data 210 as an original document.

If the document data 210 converted in such a manner is read by a corresponding application, it becomes possible to recreate the type of font of a character, a character size, character decoration information such as a bold typeface or an italic typeface, the drawing position of the character, and so forth. Therefore, it is possible to recreate the font information of the document data 210 and it is possible to easily perform correction or the like of a character using various kinds of applications. From this, the conveniences of users are improved.

In particular, by setting the origin 401 of drawing, the character width 404, and the left side bearing 403, it becomes possible to easily set the position of a character in the document data 210 and it is possible to simplify the structure of drawing data. Therefore, it is possible to enhance the general versatility of the document data 210.

In addition, in the known image processing apparatus described in the background of the art, the document data 210 includes data drawn by vectors. Therefore, there has been a problem that, in some cases, it is difficult to perform correction or the like of a character, using a read application. If a character portion of the image data 200 is not constantly located within a file as character information, it is difficult to restore an original document.

On the other hand, in the server 2 of the present embodiment, matching with an image table set for all fonts and all character sizes included in the font matching data 220 can be performed using character codes detected by the character recognition unit 110. Therefore, it becomes possible to almost certainly extract created font and character size.

In addition, comparison is performed so as to determine whether the image of a detected character matches the image data 200, and the drawing position of a character set in the document data 210 by the character recognition unit is corrected to an accurate value.

By adopting such a configuration, it becomes possible to regenerate a document serving as the source of a manuscript. In addition, the converted document data 210 can be printed so as to be put into the same state as this document serving as a source. At this time, since, in the document data 210, the attributes of characters are set in the character attribute data 211, blur, smear, and so forth due to scanning are reduced and it is possible to perform high-quality printing.

In addition, the server 2 according to an embodiment of the present disclosure is characterized in that the character attribute data setting unit 130 calculates the subsequent origin 402 where a character is subsequently drawn in accordance with the origin 401 calculated in accordance with a character whose matching is established by the font matching unit 120 and the character attribute data setting unit 130 sets as a character within the identical text 321 (FIG. 11), in the document data 210 when the subsequent origin 402 and the origin 401 of a subsequent character coincide with each other. In other words, when a distance between the subsequent origin 402 of a previous character and the origin 401 of a subsequent character is less than or equal to a specified value, belonging to the identical text 321 is set in the character attribute data 211 in the document data 210.

By adopting such a configuration, even when characters are recognized as portions of different texts by OCR or the like, it is possible to recombine the portions as a collected text. Therefore, it becomes easy to extract a text from the document data 210 and the conveniences of users are improved.

In addition, the server 2 according to an embodiment of the present disclosure includes the character image switching unit 140 that sets the drawing data of a recognized character when, with respect to the drawing position of the document data 210 corresponding to the area 301 of the image data 200, the font matching unit 120 determines as corresponding to one of the fonts and the character sizes included in the font matching data 220 and matching is established, wherein the character image switching unit 140 sets line drawing including no character or the drawing data of an image when no matching is established.

By adopting such a configuration, it becomes possible to detect a point falsely recognized in the character recognition. From this, by deleting the character attribute data 211 falsely recognized and included in the document data 210 after conversion, it becomes easy for users to edit the document data 210 and it becomes possible to enhance the conveniences of users. In addition, it is possible to create the document data 210 in which stylized data such as, for example, a company logo is mixed and whose state becomes sound by deleting a character at, for example, a point at which character recognition fails.

In addition, even when matching fails with respect to a font and a character size, it is possible to acquire the document data 210 printable with a high level of quality, by setting the drawing data of a vector for the point of a character. In addition, even when character recognition fails in the middle of a text, it is possible to reduce a feeling of strangeness at the time of viewing or printing that point.

In addition, in the present embodiment, when the document data 210 is PDF, information relating to a font is set by a font and a character size whose matching is established, for the bounding box of a font, generated by character recognition.

By adopting such a configuration, pieces of information such as fonts and start-of-writing positions in the character attribute data 211 included in PDF become accurate and it becomes possible to easily extract, from PDF, character information corresponding to a style. In addition, it becomes easy to convert from PDF into a file of an application such as a word processor or spreadsheet software.

In addition, in the description of the font matching process in the above-described embodiment, matching is performed after a character size is estimated.

However, without estimating a character size first, the control unit 20 may search within character tables in the font matching data 220 in round-robin fashion. In addition, when only vector data is stored as the font matching data 220, the percentage or the like of the number of pixels coinciding with the area 301 of the image data 200 may be calculated and matching may be performed, at the time of drawing a relevant character as primary data. In addition, the control unit 20 may perform matching at a fast rate, using a GPU arithmetic function or the like. In addition, at the time of matching, the control unit 20 may utilize data such as the vector of the line drawing of a character created in the above-described character recognition process.

By adopting such a configuration, it becomes possible to reduce the storage capacity of the storage unit 29 or speed up matching.

In addition, while, in the above-described embodiment, an example of converting into PDF or PS is described, without limitation to this it is possible to convert into various kinds of document formats.

In addition, when an image file is converted into a document file of a word processor, a file of a spreadsheet software, an HTML file, or the like, the control unit 20 may calculate the information of the drawing position of a corrected character in units of pages and calculate the settings of a standard font, line feed, a character distance, a blank space, a header, a footer, and so forth, thereby setting in the document data 210. From this, it is possible to restore the same page setting as that of a file serving as the source of a document, or the like, it becomes easy to correct a document file, and it is possible to enhance the conveniences of users.

In addition, while the above-described present embodiment is described in such a manner that the corresponding character attribute data 211 is deleted from the document data 210 when matching fails, the corresponding character attribute data 211 may be left.

In addition, the server 2 may include a character re-recognition unit that performs character recognition again by specifying the same font or character size as that of a surrounding character whose matching is established, for a character whose matching with one of a plurality of fonts and a plurality of character sizes is not established by the font matching unit 120. By adopting such a configuration, it becomes possible to increase the degree of accuracy in character recognition. In addition, it becomes possible to reliably character-recognize even a point such as an underlined character, at which it is easy for the character recognition method of the related art to fail in matching.

In addition, while the above-described embodiment is described so that first the character recognition unit 110 outputs the character attribute data 211 to the document data 210, an embodiment is not limited to this. In other words, such a configuration that the character recognition unit 110 outputs, as temporary data, character codes or the like to the storage unit 29 and the character attribute data setting unit 130 sets character codes or the like in the document data may be adopted.

By adopting such a configuration, it is possible to simplify the process and it is possible to speed up the process by reducing corrections in the document data 210.

In addition, the image file generation process of the present embodiment may be executed by the image forming apparatus 1. In addition, such a configuration that, within the image file creation processing, processing operations such as the character recognition processing and the matching processing, which require arithmetic performance, are executed in the server 2 and the other processing operations are executed in the image forming apparatus 1 may be adopted. In addition, these processing operations may be executed, in response to an instruction from a terminal of a user, in the server 2 on a so-called "cloud" including a large number of GPUs.

By adopting such a configuration, it is possible to reduce the costs of the control unit 10, the image processing unit 11, and the storage unit 19 in the image forming apparatus 1. In addition, it is possible to complete the process in a short amount of time and reduce power consumption.

In addition, the image file generation process in the present embodiment may be applied to a system not utilizing the image forming apparatus 1. In other words, a configuration where the server 2 to which a network scanner and a scanner are separately connected using USBs or the like is used may be adopted.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus that changes image data into document data comprising:
    a storage unit including the image data, the document data including character attribute data, and font matching data; and
    a control unit including at least one of a general purpose processor (GPP), a central processing unit (CPU), a micro processing unit (MPU), a digital signal processor (DSP), a graphics processing unit (GPU), or an application specific processor (ASP), configured for:
    recognizing, from the image data, an area in which one or more characters are drawn;
    calculating a vector of a line drawing of each of the one or more characters;
    judging a character code with respect to each vector by using an artificial neural network;
    setting, in the document data, the judged character code as the character attribute data;
    calculating a size of a bounding box serving as a drawing area of drawing data of a font of the font matching data corresponding to the character code;
    estimating a plurality of fonts or character sizes;
    performing matching by performing image comparison on either one or both of (i) one of the fonts and (ii) one of the character sizes;
    calculating a degree of similarity, wherein the image comparison is performed by setting windows of 8 to 192 dots in vertical and horizontal directions and calculating the degree of similarity of a luminance of a dark point of each of a pixel using dynamic programming;
    selecting the font and the character size where the degree of similarity is the highest;
    determining, if the font and the character size selected have the degree of similarity greater than or equal to a specified threshold value, as corresponding to the font and the character size and establishing matching;
    determining, if the degree of similarity is lower than the specified threshold value, that there are no corresponding font and no corresponding character size and matching is not established;
    setting each character of the character attribute data in the document data, to the font and the character size estimated;
    setting so that the character is located at a drawing position corresponding to the image data at the time of being viewed or printed, wherein an origin of drawing, a character width, and right, left, upper, and lower side bearings as the drawing position of the character so that the origin of drawing, the character width, and the right, left, upper, and lower side bearing correspond to the image data;
    calculating a subsequent origin where the character is subsequently drawn in accordance with the origin calculated in accordance with the character whose matching is established, wherein, if the subsequent origin and the origin of the subsequent character coincide with each other, the character whose matching is established and the subsequent character are set as the characters within an identical text in the document data; and
    setting, in the document data, a line drawing including no character or the drawing data of an image, if no matching is established with respect to the drawing position of the document data corresponding to the area of the image data, by determining as corresponding to none of the fonts and the character sizes included in the font matching data.

2. An image forming system comprising:
    an image forming apparatus that receives image data as an input; and a server communicatively connected to the image forming apparatus, the server being configured to change the image data into document data, the server including:
    a storage unit including the image data, the document data including character attribute data, and font matching data; and
    a control unit including at least one of a general purpose processor (GPP), a central processing unit (CPU), a micro processing unit (MPU), a digital signal processor (DSP), a graphics processing unit (GPU), or an application specific processor (ASP), configured for:
    recognizing, from the image data, an area in which one or more characters are drawn;
    calculating a vector of a line drawing of each of the one or more characters;
    judging a character code with respect to each of the vector by using an artificial neural network;
    setting, in the document data, the judged character code as the character attribute data;
    calculating a size of a bounding box serving as a drawing area of drawing data of a font of the font matching data corresponding to the character code;
    estimating a plurality of fonts or character sizes;
    performing matching by performing image comparison on either one or both of (i) one of the fonts and (ii) one of the character sizes;
    calculating a degree of similarity, wherein the image comparison is performed by setting windows of 8 to 192 dots in vertical and horizontal directions and calculating the degree of similarity of a luminance of a dark point of each of a pixel using dynamic programming;
    selecting the font and the character size where the degree of similarity is the highest;
    determining, if the font and the character size selected have the degree of similarity greater than or equal to a specified threshold value, as corresponding to the font and the character size and establishing matching;
    determining, if the degree of similarity is lower than the specified threshold value, that there are no corresponding font and no corresponding character size and matching is not established;

setting each character of the character attribute data in the document data, to the font and the character size estimated;

setting so that the character is located at a drawing position corresponding to the image data at the time of being viewed or printed, wherein an origin of drawing, a character width, and right, left, upper, and lower side bearings as the drawing position of the character so that the origin of drawing, the character width, and the right, left, upper, and lower side bearing correspond to the image data;

calculating a subsequent origin where the character is subsequently drawn in accordance with the origin calculated in accordance with the character whose matching is established, wherein, if the subsequent origin and the origin of the subsequent character coincide with each other, the character whose matching is established and the subsequent character are set as the characters within an identical text in the document data; and setting, in the document data, a line drawing including no character or the drawing data of an image, if no matching is established with respect to the drawing position of the document data corresponding to the area of the image data, by determining as corresponding to none of the fonts and the character sizes included in the font matching data.

3. A method for changing image data into document data, comprising:

recognizing from the image data, an area in which one or more characters are drawn;

calculating a vector of a line drawing of each of the one or more characters;

judging a character code with respect to each of the vector by using an artificial neural network;

setting, in the document data, the judged character code as the character attribute data;

calculating a size of a bounding box serving as a drawing area of drawing data of a font of font matching data corresponding to the character code;

estimating a plurality of fonts or character sizes;

performing matching by performing image comparison on either one or both of (i) one of the fonts and (ii) one of the character sizes;

calculating a degree of similarity, wherein the image comparison is performed by setting windows of 8 to 192 dots in vertical and horizontal directions and calculating the degree of similarity of a luminance of a dark point of each of a pixel using dynamic programming;

selecting the font and the character size where the degree of similarity is the highest;

determining, if the font and the character size selected have the degree of similarity greater than or equal to a specified threshold value, as corresponding to the font and the character size and establishing matching;

determining, if the degree of similarity is lower than the specified threshold value, that there are no corresponding font and no corresponding character size and matching is not established;

setting each character of the character attribute data in the document data to the font and the character size estimated;

setting so that the character is located at a drawing position corresponding to the image data at the time of being viewed or printed, wherein an origin of drawing, a character width, and right, left, upper, and lower side bearings as the drawing position of the character so that the origin of drawing, the character width, and the right, left, upper, and lower side bearings correspond to the image data;

calculating a subsequent origin where the character is subsequently drawn in accordance with the origin calculated in accordance with the character whose matching is established, wherein, if the subsequent origin and the origin of the subsequent character coincide with each other, the character whose matching is established and the subsequent character are set as the characters within an identical text in the document data; and setting, in the document data, a line drawing including no character or the drawing data of an image, if no matching is established with respect to the drawing position of the document data corresponding to the area of the image data, by determining as corresponding to none of the fonts and the character sizes included in the font matching data.

* * * * *